(12) United States Patent
Scanzillo (10) Patent No.: US 7,388,164 B2
(45) Date of Patent: Jun. 17, 2008

(54) LARGE CAPACITY MULTIPLE SERVICE FLOOR BOX

(75) Inventor: Thomas L. Scanzillo, Monroe, CT (US)

(73) Assignee: Hubbell Incorporated, Orange, CT (US)

( * ) Notice: Subject to any disclaimer, the term of this patent is extended or adjusted under 35 U.S.C. 154(b) by 234 days.

(21) Appl. No.: 10/911,646

(22) Filed: Aug. 5, 2004

(65) Prior Publication Data

US 2006/0027384 A1   Feb. 9, 2006

(51) Int. Cl.
*H02G 3/08* (2006.01)
(52) U.S. Cl. ............ 174/482; 174/490; 174/50; 220/3.2; 220/3.3
(58) Field of Classification Search ......... 174/50, 174/53, 57, 58, 480, 481, 482, 483, 484, 174/486, 487, 490, 500, 66, 67; 220/3.2–3.9, 220/4.02, 521; 248/906; 52/220.8, 220.1
See application file for complete search history.

(56) References Cited

U.S. PATENT DOCUMENTS

| | | | |
|---|---|---|---|
| 3,318,476 A | 5/1967 | Clark | |
| 3,666,134 A | 5/1972 | Rauch | |
| 3,923,197 A | 12/1975 | Kuhn | |
| 4,031,312 A | 6/1977 | Coleman et al. | |
| 4,355,197 A | 10/1982 | Jonsson | |
| 4,410,004 A * | 10/1983 | Kifer et al. | 137/360 |
| 4,654,470 A * | 3/1987 | Feldman et al. | 174/50 |
| 5,232,277 A | 8/1993 | Cassady et al. | |
| 5,245,507 A | 9/1993 | Ericksen | |
| 5,310,075 A | 5/1994 | Wyler | |
| 5,466,886 A | 11/1995 | Lengyel et al. | |
| 5,555,907 A * | 9/1996 | Philipp | 137/312 |
| 5,627,340 A | 5/1997 | Smith et al. | |
| 5,679,924 A * | 10/1997 | Young et al. | 174/50 |
| 5,796,037 A * | 8/1998 | Young et al. | 174/50 |
| 5,831,212 A * | 11/1998 | Whitehead et al. | 174/50 |
| 5,866,845 A | 2/1999 | Markiewicz et al. | |
| 5,925,848 A * | 7/1999 | Elliott, Jr. | 174/50 |
| 6,179,634 B1 | 1/2001 | Hull et al. | |
| 6,239,368 B1 | 5/2001 | Gretz | |
| 6,265,662 B1 | 7/2001 | Riedy et al. | |
| 6,316,725 B1 * | 11/2001 | Cole et al. | 174/486 |
| 6,321,925 B1 * | 11/2001 | Crouse et al. | 220/521 |
| 6,362,951 B1 | 3/2002 | Moribe et al. | |

(Continued)

OTHER PUBLICATIONS

MAXICOM, In-Floor Utility Enclosures, unknown publication date.

(Continued)

*Primary Examiner*—Angel R Estrada
(74) *Attorney, Agent, or Firm*—Kevin M. Barner; Mark S. Bicks; Alfred N. Goodman (57) ABSTRACT

An electrical floor box for providing multiple services such as electrical service and communication service has a housing formed from a top section, a bottom section, and a middle section connecting the top and bottom section. The housing is covered by a cover that rests in a cover flange. The cover flange has a gutter for collecting any liquids that seep into the housing. A removable power panel rests in the interior of the housing and provides electrical receptacles. An accessory box for providing additional services such as compressed air and water can be attached to electrical floor box.

17 Claims, 8 Drawing Sheets

U.S. PATENT DOCUMENTS

| | | |
|---|---|---|
| 6,462,277 B1 | 10/2002 | Young et al. |
| 6,545,215 B2 | 4/2003 | Young et al. |
| 6,568,420 B2 | 5/2003 | Renn et al. |
| 6,610,927 B2 * | 8/2003 | Dinh et al. .................... 174/66 |
| 6,612,081 B2 | 9/2003 | Cole et al. |
| 6,774,309 B2 | 8/2004 | Kasai |
| 6,843,669 B2 * | 1/2005 | Drane et al. ................ 174/480 |
| 6,929,140 B2 * | 8/2005 | Rose .......................... 220/3.7 |
| 7,075,005 B1 * | 7/2006 | Drane ......................... 174/50 |
| 7,157,643 B2 * | 1/2007 | Drane ......................... 174/66 |
| 2004/0083658 A1 | 5/2004 | Laukuf et al. |
| 2005/0246982 A1 * | 11/2005 | MacMilan et al. |

OTHER PUBLICATIONS

Combined Utility Box Systems, Cubs Floor Box Details, unknown publication date.

WIREMOLD, Large Capacity, Multi-Utility Floor Box, unknown publication date.

* cited by examiner

LARGE CAPACITY MULTIPLE SERVICE FLOOR BOX

FIELD OF THE INVENTION

The present invention generally relates to electrical boxes. More specifically, the present invention relates to an electrical box for mounting in a concrete floor.

BACKGROUND OF THE INVENTION

Electrical boxes are installed in concrete floors to provide outlets for various services, such as electrical power service or lower voltage service for telephone and data communications. Typical floor boxes have a housing with a removable cover to allow access to the interior of the housing. Among other things, a recurring problem with floor mounted electrical boxes is seepage of liquids past the cover and into the housing. This occurs because concrete floors in places such as convention centers are often hosed off to clean the floors.

Thus, there is a continuing need to provide electrical boxes which prevent seepage of liquid into the interior compartment of the housing. Additionally, there is a continuing need to provide electrical boxes that are easily assembled and permit easy access to the wires and other elements contained therein. This invention addresses these needs in the art as well as other needs, which will become apparent to those skilled in the art once given this disclosure.

SUMMARY OF THE INVENTION

One object of the present invention is to provide an improved electrical floor box.

Another object of the invention is to provide an electrical box which is resistant to water entering the box.

Still another object of the invention is to provide an electrical box that is easily assembled.

A further object of the invention is to provide an electrical box that provides easy access to the wiring and other elements contained within the box.

The foregoing objects are basically attained by providing an electrical box that has a housing with at least one interior compartment. A cover flange is attached to the top of the housing and receives a cover that covers the interior compartment of the housing. The joint between the cover flange and the cover is sealed with a gasket. A gutter is formed around the interior periphery of the cover flange. The gutter leads to a drain pipe. Any liquid that seeps past the gasket between the cover flange and the cover is collected by the gutter and drained away from the interior of the electrical box.

The foregoing objects are further attained by a method of manufacturing a housing for an electrical floor box by moulding three separate sections and fastening the three sections together. First, a bottom section with a floor and four sidewalls extending from the floor is molded. Next, a top section with four sidewalls connected to one another is molded. Then, a middle section with a cross-sectional shape like an H is molded. The arms of the H form two grooves. The sidewalls of the bottom section are inserted into one of the two grooves of the H and the sidewalls of the top section are inserted into the other groove of the H, thereby forming the housing.

Other objects, advantages, and salient features of the present invention will become apparent from the following detailed description, which, taken in conjunction with the annexed drawings, discloses preferred embodiments of the invention.

BRIEF DESCRIPTION OF THE DRAWINGS

Referring to the drawings which form a part of this disclosure.

DETAILED DESCRIPTION OF THE INVENTION

Figure 1:
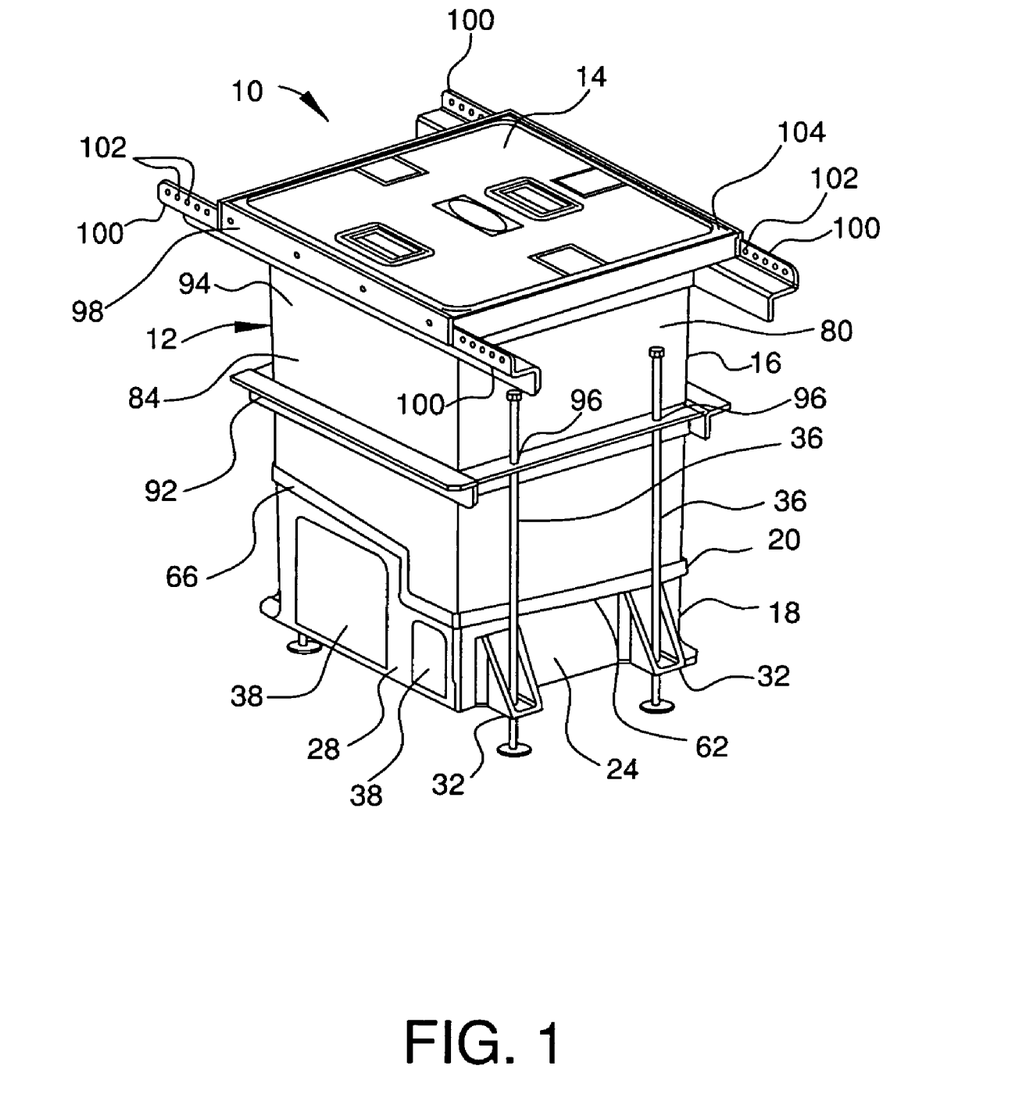
FIG. 1 is a perspective view of an electrical floor box in accordance with a first embodiment of the present invention.
Figure 2:
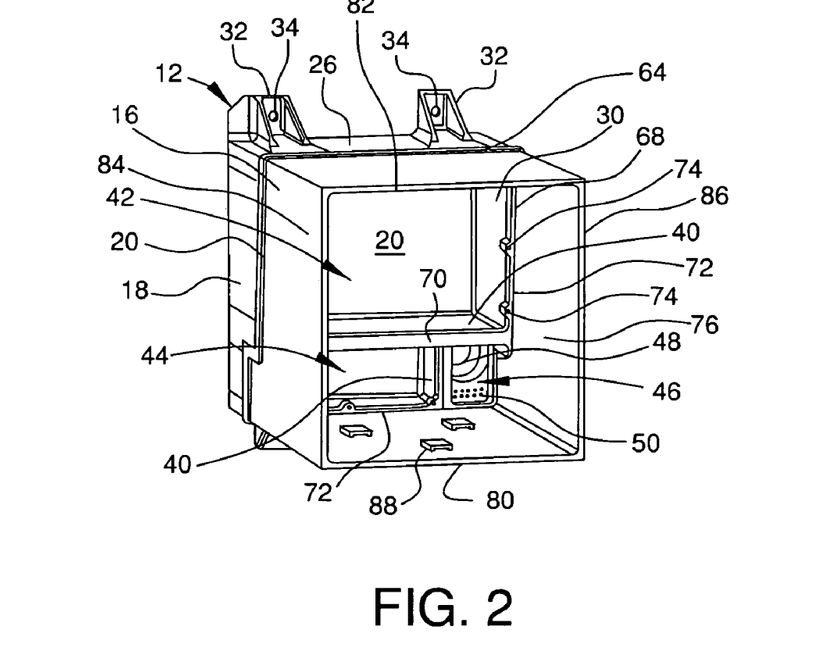
FIG. 2 is a perspective view from another angle of the housing of the electrical floor box shown in FIG. 1.

Referring initially to FIGS. 1 and 2, the electrical floor box 10 in accordance with the invention has a housing 12 with a cover 14. The floor box provides multiple services (power and low voltage) and is particularly suitable for use in convention centers. Preferably, the housing has an interior dimension of approximately 18 inches square and 24 inches deep. The electrical floor box is installed in a concrete floor by placing the box into position and then pouring concrete around the box.

The housing 12 has three sections: a top section 16, a bottom section 18, and a connecting, middle section 20. Each of the three sections is preferably formed by reaction injection molding a polyurethane material. The bottom section 18 of the power housing 12 has a floor 22, a front sidewall 24, a rear sidewall 26, a left sidewall 26, and a right sidewall 28. The front sidewall 24 and rear sidewall 26 both have two integral feet 32 with holes 34 therein to allow threaded leveling rods 36 to pass therethrough. The sidewalls 22, 24, 26, and 28 of the bottom section 18 extend from the floor 22 and are preferably slightly angled with respect to vertical to provide draft for molding during manufacturing. Vertical mounting surfaces 38 are provided on the right and left sidewalls 28, 30 to facilitate mating with conduit sections during installation.

The bottom section 18 has internal walls 40 which divide the bottom section into three different compartments: a power compartment 42, a low voltage compartment 44, and a drain compartment 46. The drain compartment 46 receives any liquid which enters into the floor box 10, and has an opening 48 for connection with a drain pipe (not shown). An overflow drain 50 is adjacent the opening 48 for the drain pipe, and is preferably covered with a performed sheet metal screen. The overflow drain is connected to a drain pipe (not shown). The overflow drain 50 is located at a higher elevation than the opening 48. Thus, in normal operation, water that enters the box exits through the opening 48. If the opening 48 is clogged, however, the water will eventually rise to the level of the overflow drain 50 and exit through the overflow drain 50.

Figure 3:
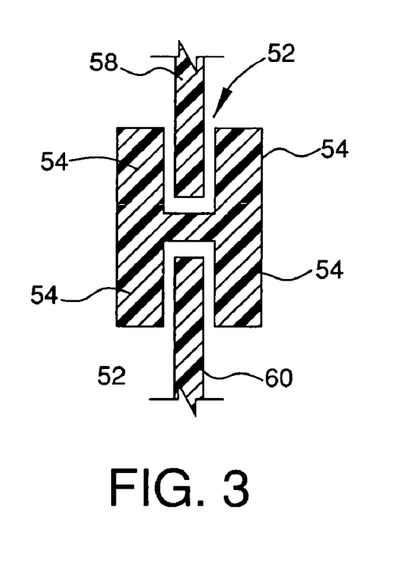
FIG. 3 is an elevational view in cross-section through a portion of the sidewall of the housing of the electrical box illustrated in FIG. 1.

A middle section 20 connects the bottom section 18 to the top section 16. As shown in FIG. 3, the middle section 20 has a cross-section shaped like an H. When constructed in this manner, the top section 16, bottom section 18, and middle section 18 can be formed by reaction injection molding each section independently. The housing 12 is then formed by placing the sidewall 58 of the top section 16 and the sidewall 60 of the bottom section 18 into the grooves 52 formed by the arms 54 of the H shape of the middle section 20. Preferably, the sidewalls are held into place with an adhesive.

Returning to FIGS. 1 and 2, the middle section 20 of the housing 12 has a front side 62, a rear side 64, a left side 66, and a right side 68. A cross bar 70 extends between the left side 66 and right side 68. The middle section 20 forms a ledge 72 on the interior surface 76 of the housing 12 and has mounting pads 74.

Figure 4:
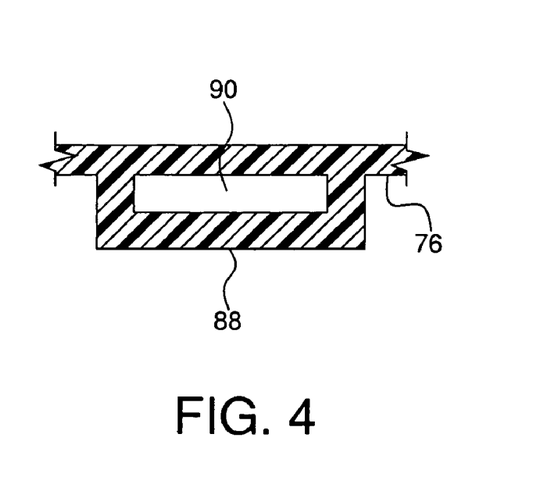
FIG. 4 is a top plan view in cross-section of a cable wire tie off point.
Figure 5:
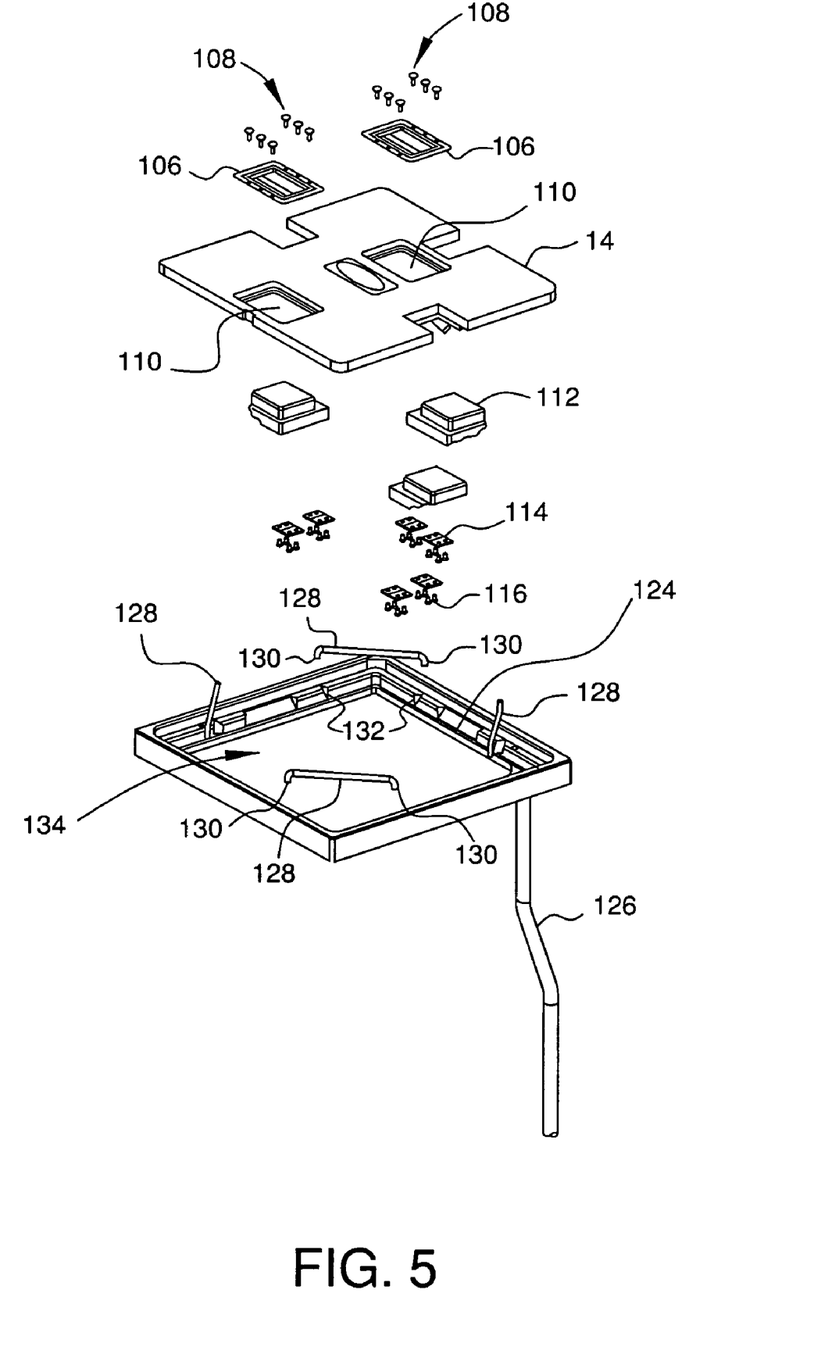
FIG. 5 is an exploded perspective view of the cover and cover flange assembly of the electrical floor box shown in FIG. 1.
Figures 6, 7:
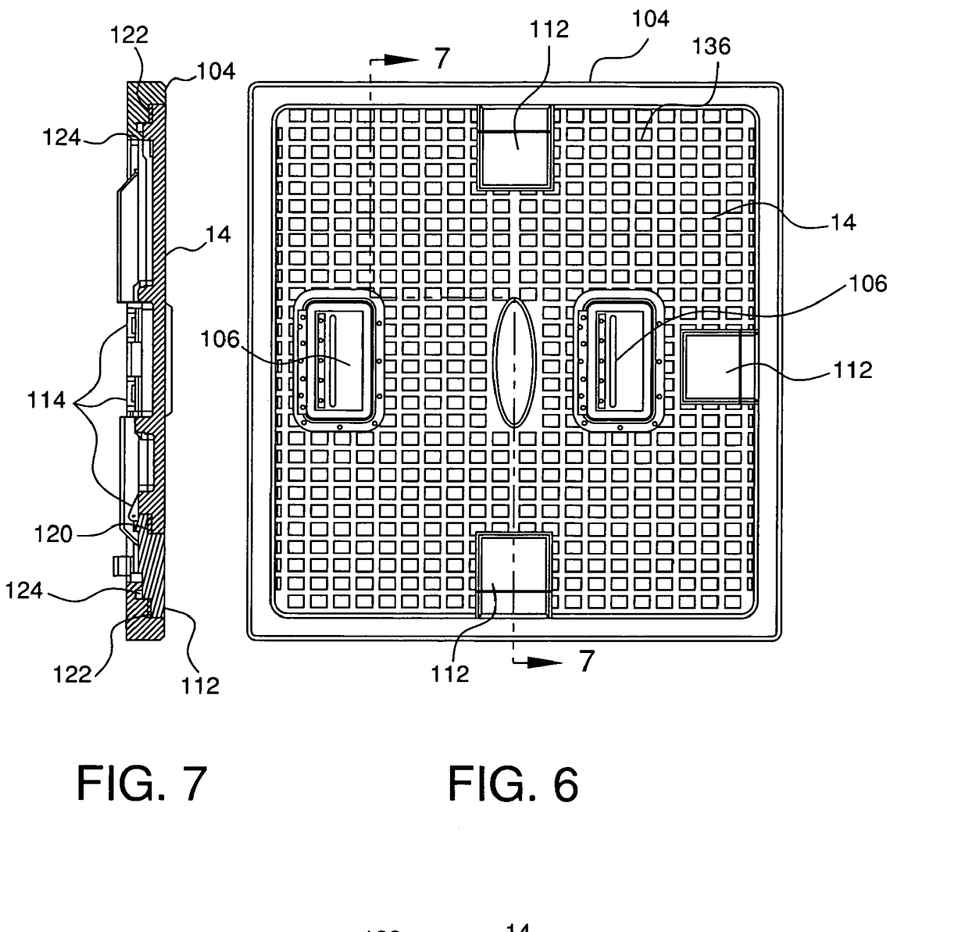
FIG. 6 is a top plan view of the cover and cover flange assembly of the electrical floor box shown in FIG. 5.
FIG. 7 i a side elevational view in cross-section of the cover and cover flange assembly taken through line 7-7 of FIG. 6.

The top section 16 of the floor box has a front sidewall 80, a rear sidewall 82, a left sidewall 84, and a right sidewall 86. Cable tie-off points 88 are provided on the interior surface 76 of the sidewalls. As shown in FIG. 4, the cable tie-off points 88 are preferably integrally molded with the sidewalls. An aperture 90 extends through the tie-off points 88 so that an installer may pass cable ties through the tie-off points.

Returning to FIG. 1, a reinforcing bracket 92 is mounted around the exterior surface 94 of the top section 16 to provide additional strength to the top section 16. The reinforcing bracket 92 is formed of four pieces of angle iron welded together and is fastened to the top section 16 using screws. The reinforcing bracket has threaded holes 96 to receive the threaded leveling rods 36. During installation, the threaded leveling rods 36 may be used to adjust the tilt and angle of the box as desired.

A top frame 98 formed from four substantially Z-shaped pieces of metal welded together is fastened to the top section 16 using screws. The top frame 98 has four extended portions 100 with holes 102 extending therethrough. The holes 102 are provided so that the floor box may be wired to the reinforcing bar (rebar) typically placed in concrete during installation.

A cover flange 104 is mounted inside the top frame 98 and receives the cover 14. Preferably, both the cover flange 104 and the cover 14 are formed of cast aluminum. Referring to FIGS. 5-8, the cover 14 has two conventional spring loaded hatch handles 106 mounted in recesses 110 in the cover with screws 108. The cover 14 also has cable doors 112 mounted in openings 118 by hinges 114 and screws 116. The hinged cable doors 112 allow cables to pass through the cover and into the box when they are open, and are sealed to the cover with a gasket 120 to prevent moisture from entering the box when they are closed. The top surface 136 of the cover is preferably textured.

Figure 8:
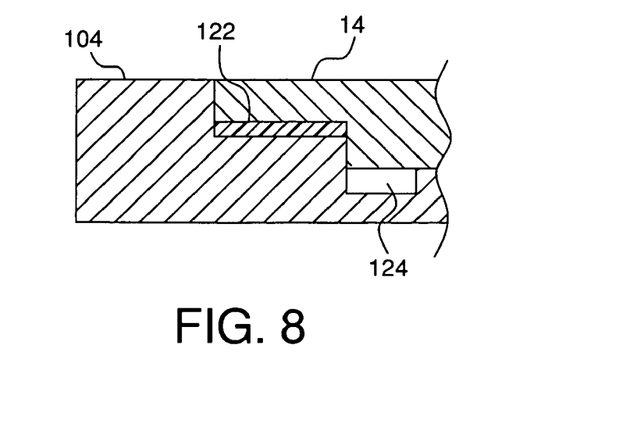
FIG. 8 is an enlarged side elevational view in cross-section of the gutter of the cover flange shown in FIG. 7.

As seen most clearly in FIG. 8, the joint between the cover flange 104 and the cover 14 is sealed by a gasket 122. A gutter 124 is located around the inner periphery of the cover flange 104 and captures any liquid that seeps past the gasket 122 between the cover 14 and the cover flange 104. The gutter 124 drains into a drain tube 126. The drain tube 126 empties into the floor drain compartment 46.

Safety bars 128 are located in each corner of the cover flange 104. The safety bars 128 are preferably formed of ⅜ inch diameter cold rolled steel bar stock bent substantially into a U-shape. The upturned ends 130 of the U-shape fit into recesses 132 located in the cover flange 104. The safety bars 128 reduce the effective size of the housing opening 134, and prevent the cover 14 from being dropped into the floor box. The safety bars 128 are removable so that a user may have unrestricted access to the interior compartment if desired.

Figure 9:
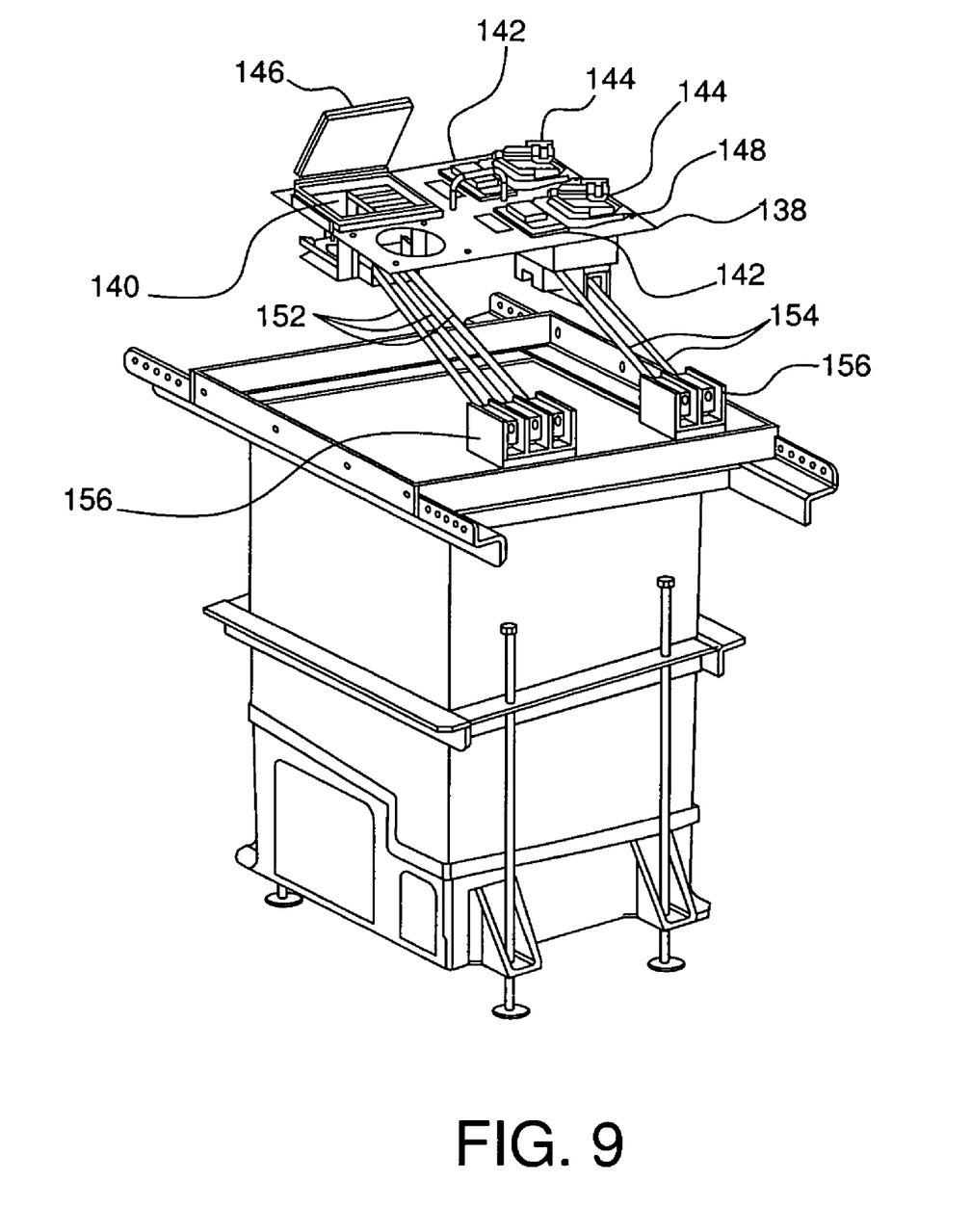
FIG. 9 is an exploded perspective view of the power panel of the electrical floor box shown in FIG. 1.

Turning to FIG. 9, a removable power panel 138 formed of sheet metal contains various electrical fittings. The exact configuration of the electrical fittings is chosen as desired for the application. In the illustrated embodiment, the power panel has eight circuit breaker poles 140, two straight blade receptacles 142, and two twist lock receptacles 144. Preferably, each of the circuit breakers is covered by a weather resistant door 146 and the receptacles are covered with removable weather shields 148 to prevent moisture from entering the receptacles. A pin and sleeve receptacle (not shown) is fastened into the opening 148 in the power panel 138. A handle 150 is attached to the power panel so that the power panel 138 may be easily grasped and removed.

Preferably, the power panel 138 is prewired in a manufacturing facility. When prewired, the connection between the various electrical fittings on the power panel 138 is performed prior to installing the power panel. The only connections that need to be made in the field when installing the panel are to connect the power feed cables 152 and the ground and neutral cables 154 to a suitable supply source. In the illustrated embodiment, there are three power feed cables 152 so that three phase power may be provided.

Terminal blocks 156 are mounted on the floor 22 of the power compartment 42 in the housing 12. One side of each of the terminal blocks 156 is connected to either the building power supply or to the building ground or neutral. During installation of the power panel 138, the power feed cables 152 and ground cables from the prewired power panel are connected to the other side of the terminal blocks 156. Although the cables 152, 154 are illustrated as straight lines here, in actual use the cables 152, 154 are of sufficient length so that they may be attached to the terminals 156 on the floor 22 of the housing 12 while the power panel 138 is outside the box. The cables 152, 154 are preferably fine-stranded cables for flexibility, such as welding cables. When configured in this manner, the power panel 138 may be easily installed and removed for repair, replacement, or upgrade.

Referring to FIG. 2, the power panel 138 rests on the ledge 72 formed by the middle section 20 and covers the power compartment 42 when it is installed. The power panel 138 is fastened to the middle section by screws that enter into the mounting pads 74. A gasket (not shown) is located between the power panel and the middle section to prevent moisture from entering the power compartment 42. As seen in FIG. 1, the middle section 20 is pitched so that any water that enters the floor box and strikes the power panel 138 runs off and enters either the floor drain compartment 46 or the low voltage compartment 44.

Figure 10:
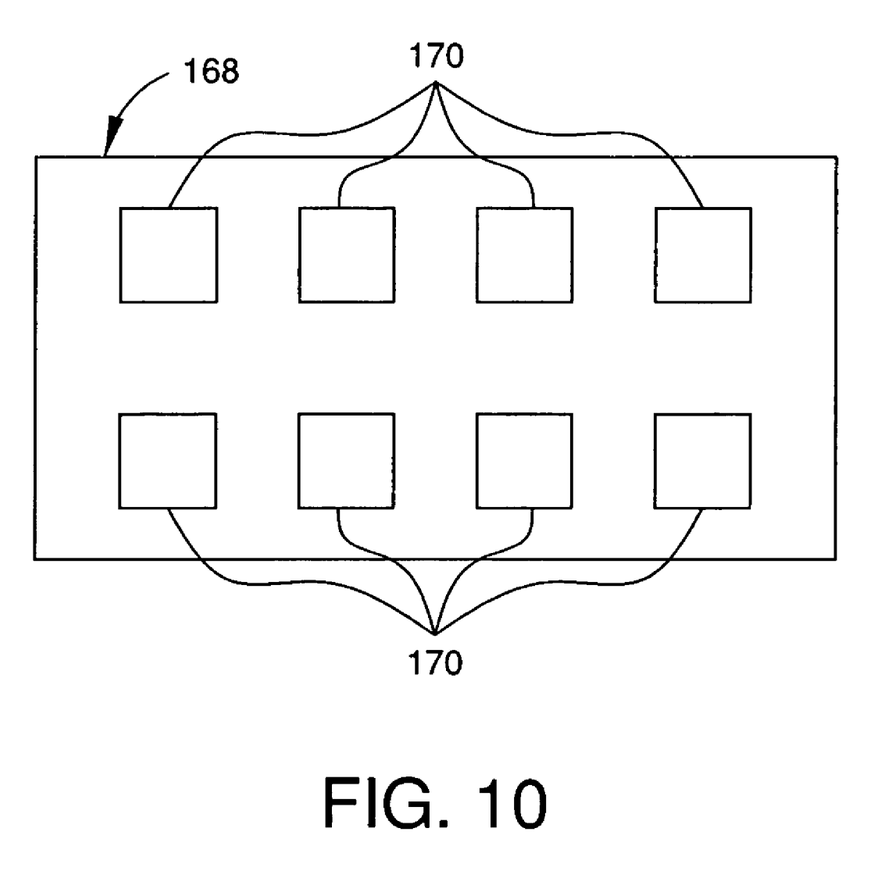
FIG. 10 is a diagrammatic top plan view of the low voltage panel of the electrical floor box shown in FIG. 1.

The low voltage compartment 44 is configured in a similar fashion to the power compartment. A low voltage panel 168, shown schematically in FIG. 10, is formed of sheet metal and fittings 170 are installed on the panel. The fittings 170 are configured as desired for the particular application, and can be such things as telephone jacks or data communication jacks. The panel 170 is fastened to the middle section 20 with a gasket and covers the low voltage compartment 44. Preferably, the low voltage panel 170 is prewired and terminal blocks are provided in the low voltage compartment so that it may be installed in the manner described above with respect to the power panel. Further, the low voltage panel is pitched so that any water striking the low voltage panel runs off into the floor drain compartment. Thus, any water that seeps into the floor box is eventually directed to the floor drain compartment, where it may exit the box.

Figure 11:
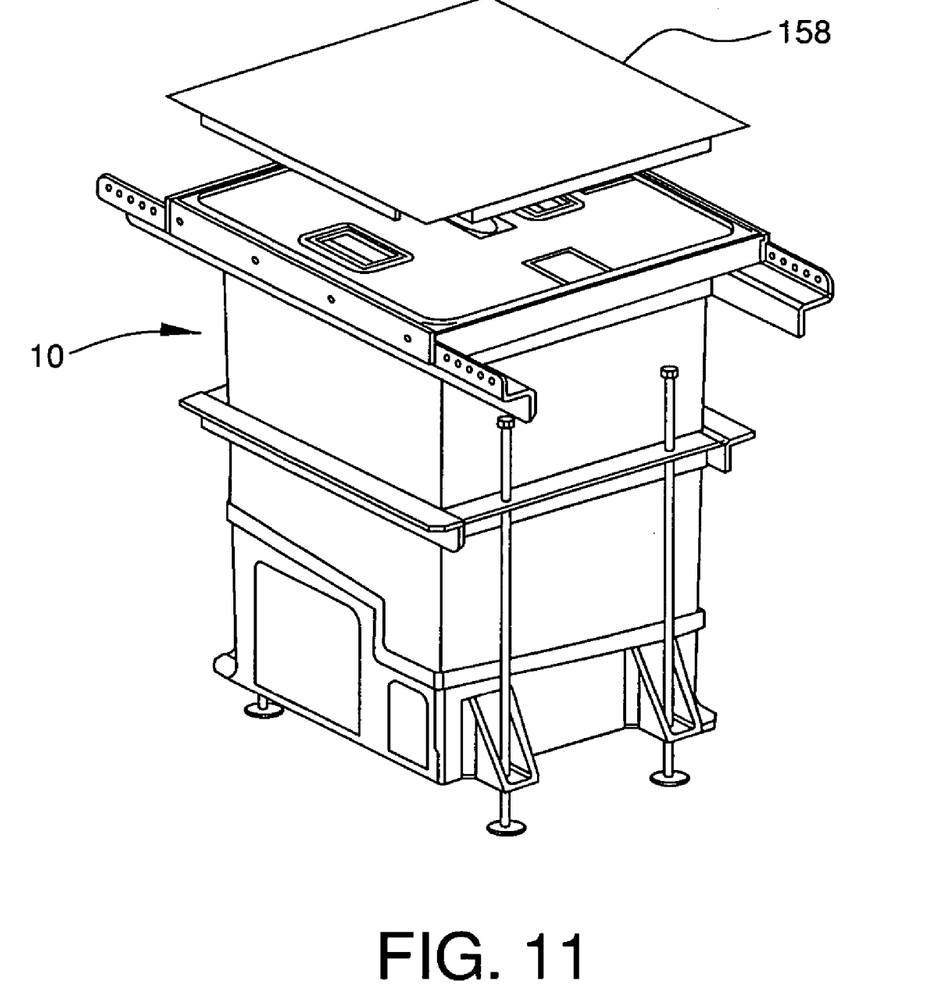
FIG. 11 is a perspective view of the electrical floor box shown in FIG. 1 with a pre-pour concrete cover.

FIG. 11 illustrates the floor box 10 with a concrete cover 158. The concrete cover is formed of sheet metal and is configured to overlay the cover and cover flange of the floor box. The concrete cover is installed prior to pouring concrete around the box to protect the floor box while the concrete is being poured. After the concrete has been poured, the cover 158 is removed and either discarded or reused.

Figure 12:
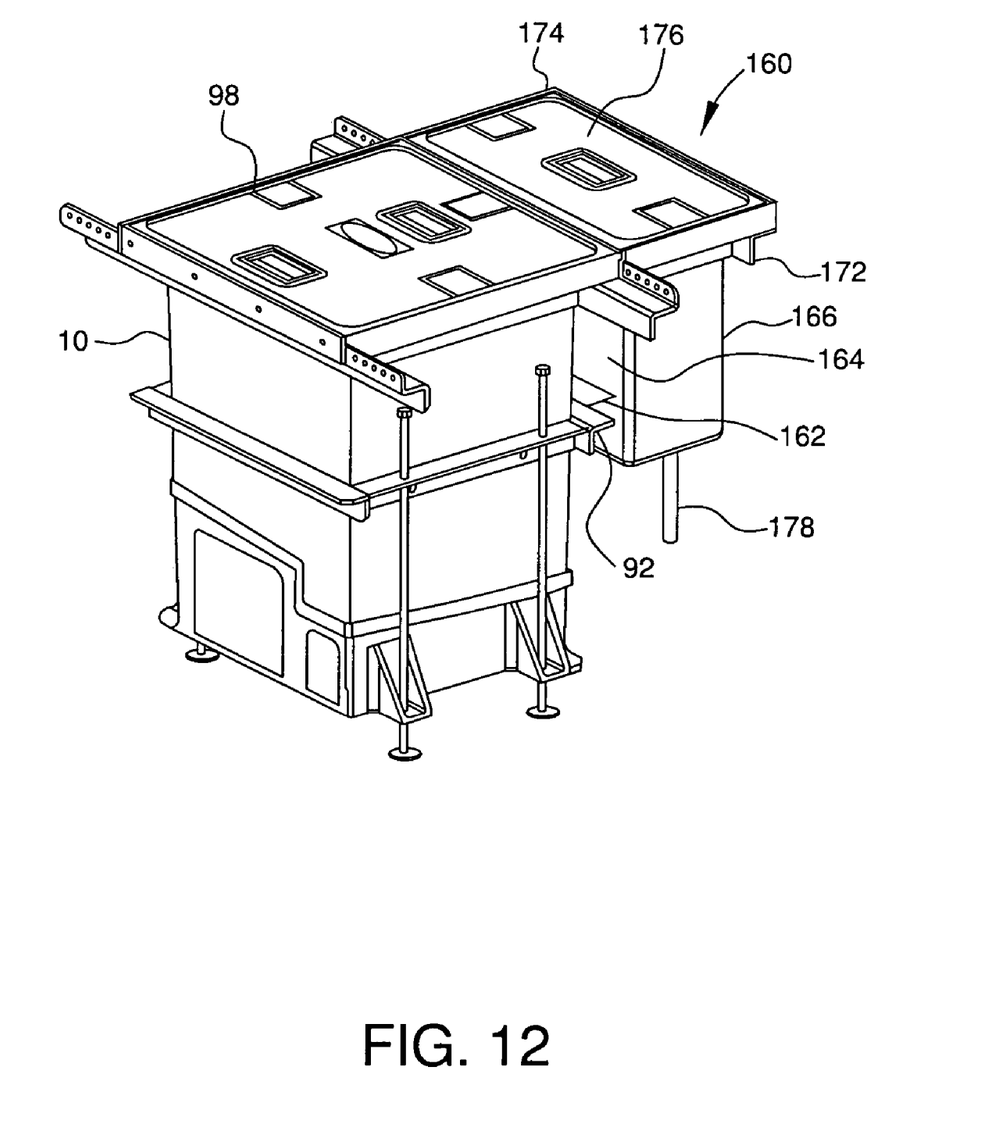
FIG. 12 is a perspective view of an electrical floor box in accordance with a second embodiment of the present invention.

FIG. 12 shows another embodiment of the invention. In this embodiment, the floor box 10 is constructed in the manner described above and an accessory box 160 is also attached to the floor box. The accessory box 160 is preferably formed by a one-piece, molded, polyurethane housing 166, and preferably has a single interior compartment. Air, water, or any other desired service may be provided by the accessory box. A mounting bridge 162 is attached to the side 164 of the accessory box housing 166 and is positioned at an appropriate height so that it may be attached to the reinforcing bracket 92 of the floor box 10 with screws. An accessory box frame 172 surrounds the top periphery of the housing 166, and is fastened to the top frame 98 of the floor box 10. The accessory box 160 is covered by a cover flange 174 and cover 176. The details of the construction of the cover flange and cover are substantially similar to those described with respect to the floor box 10, and thus are not repeated. A drain pipe 178 drains water away from the accessory box.

While various embodiments have been chosen to illustrate the invention, it will be understood by those skilled in the art that various changes and modifications can be made therein without departing from the scope of the invention as defined in the appended claims.

What is claimed is:

1. An electrical floor box for providing multiple services, comprising:
   a housing having at least one interior compartment, a top section, a bottom section, and a middle section connecting the top and bottom sections, each of the top, bottom, and middle sections being formed independently;
   a cover flange fastened to the top of the housing, the cover flange having an interior periphery with a gutter connected to a drain pipe; and
   a cover for covering the interior compartment of the housing.

2. An electrical floor box according to claim 1, wherein safety bars are located in the corners of the cover flange to prevent the cover from entering the interior compartment of the housing.

3. An electrical floor box according to claim 1, wherein the housing has a power compartment, a low voltage compartment, and a drain compartment.

4. An electrical floor box according to claim 3, wherein the drain compartment has an opening for connection with a drain pipe; and
   the drain compartment has an overflow drain.

5. An electrical floor box according to claim 1, wherein the bottom section has a floor and interior walls to form three compartments.

6. An electrical floor box according to claim 5, wherein a power panel with electrical fittings is fastened to the middle section and covers one of the three compartments.

7. An electrical floor box according to claim 1, further comprising
   threaded leveling rods attached to the exterior of the floor box.

8. An electrical floor box according to claim 1, further comprising
   a removable concrete pour cover to cover the box while the box is installed into concrete.

9. An electrical floor box according to claim 1, further comprising
   an accessory box attached to the housing.

10. An electrical floor box according to claim 1, wherein cable tie off points are formed on the interior surface of the housing.

11. An electrical floor box according to claim 1, wherein the middle section has a H-shaped cross-section.

12. An electrical floor box for providing multiple services, comprising:
    a housing having at least one interior compartment and a bottom section forming a floor of the housing;
    internal walls dividing the bottom section of the housing into a plurality of compartments, at least one of the compartments being a drain compartment for receiving any liquid which enters into the interior compartment of the floor box, the drain compartment having an opening for connection with a drain pipe;
    a cover for covering the interior compartment of the housing,
    a cover flange fastened to the top of the housing; and
    threaded leveling rods attached to the exterior of the floor box,
    wherein the housing further comprises a middle section supporting at least one panel, the middle section being pitched such that any liquid that strikes the at least one panel is directed to the drain compartment; and
    wherein the housing further comprises a top section forming the top of the housing and the middle section connects the top and bottom sections of the housing and wherein further the cover flange has an interior periphery with a gutter connected to the drain pipe.

13. An electrical floor box according to claim 12, wherein the top, bottom, and middle sections are independent.

14. An electrical floor box according to claim 12, wherein the middle section has a H-shaped cross-section.

15. An electrical floor box according to claim 12, wherein the middle section comprises mounting pads for connecting a wiring device to the middle section.

16. An electrical floor box according to claim 12, further comprising
    an accessory box attached to the housing.

17. An electrical floor box for providing multiple services, comprising:
    a housing having at least one interior compartment, a top section, a bottom section, and a middle section connecting the top and bottom sections, each of the top, bottom, and middle sections being formed independently, the bottom section having a floor and interior walls to form three compartments;
    a power panel with electrical fittings fastened to the middle section and covering one of the three compartments;
    a cover flange fastened to the top of the housing; and
    a cover for covering the interior compartment of the housing.

* * * * *